March 9, 1954  S. S. McINTYRE  2,671,639
DRUM INTERLOCKING AND POWER REGENERATIVE BRAKING SYSTEM
Filed June 23, 1952                                     7 Sheets-Sheet 1
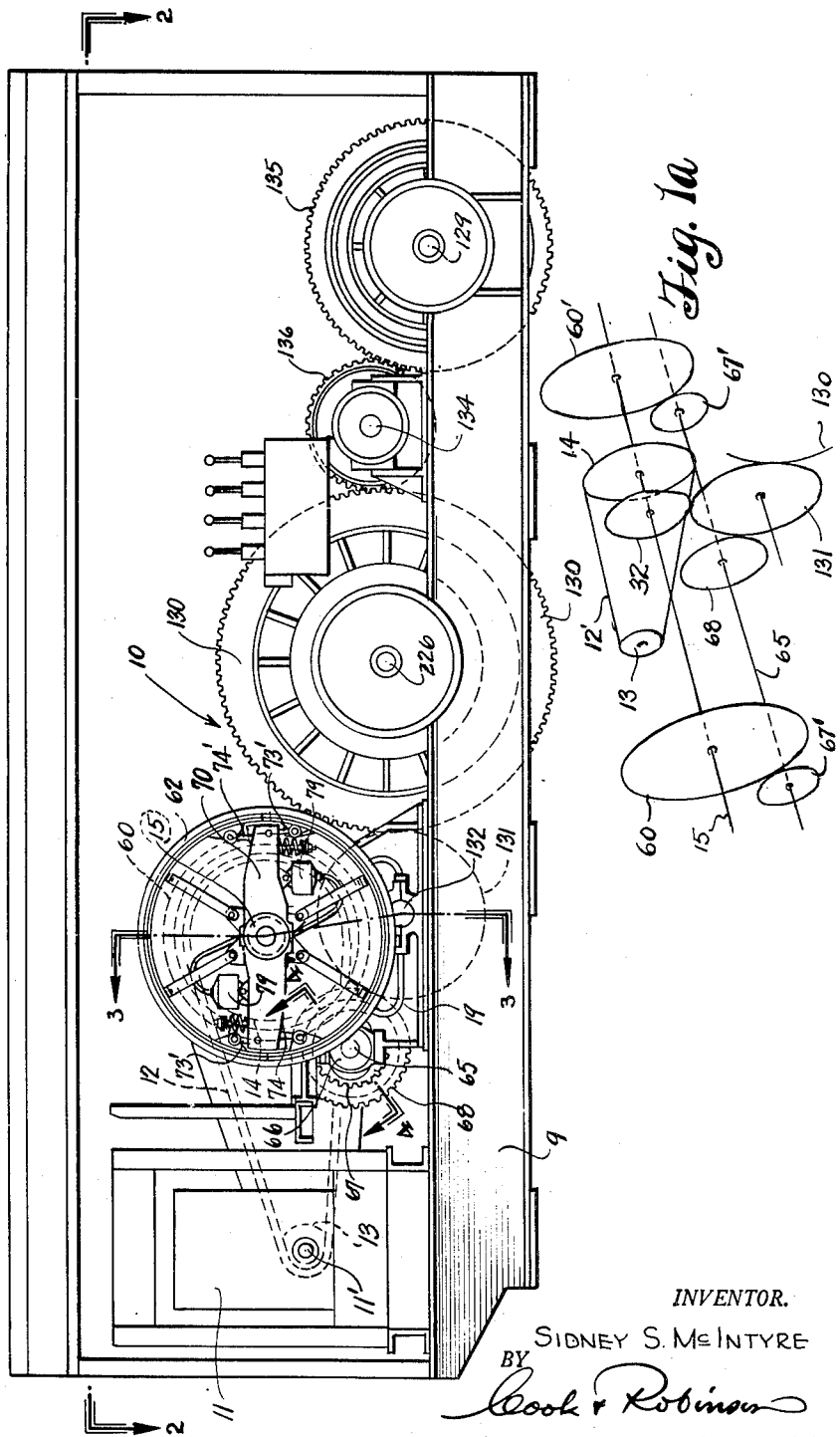
INVENTOR.
SIDNEY S. McINTYRE
BY
Cook & Robinson
ATTORNEYS

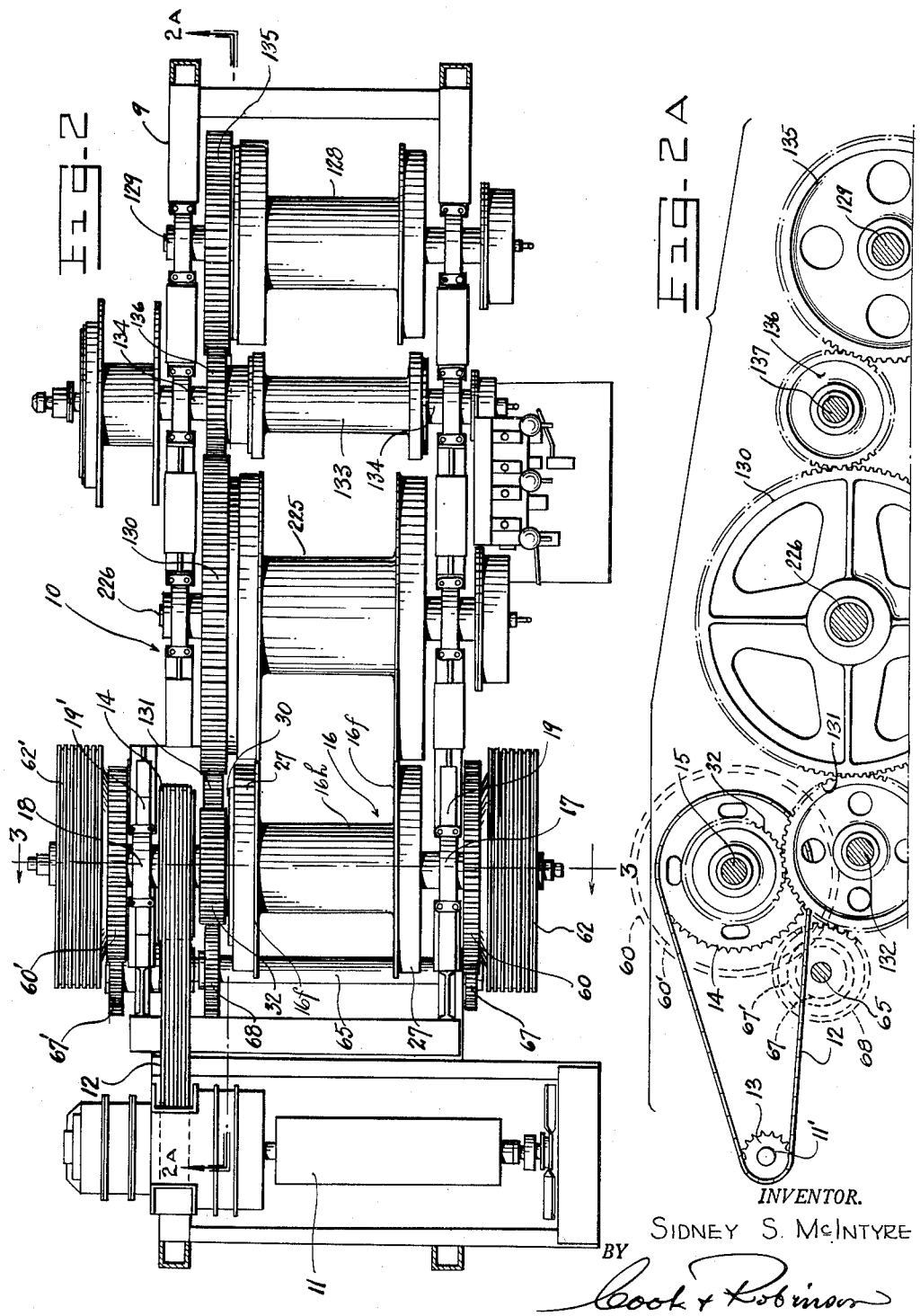

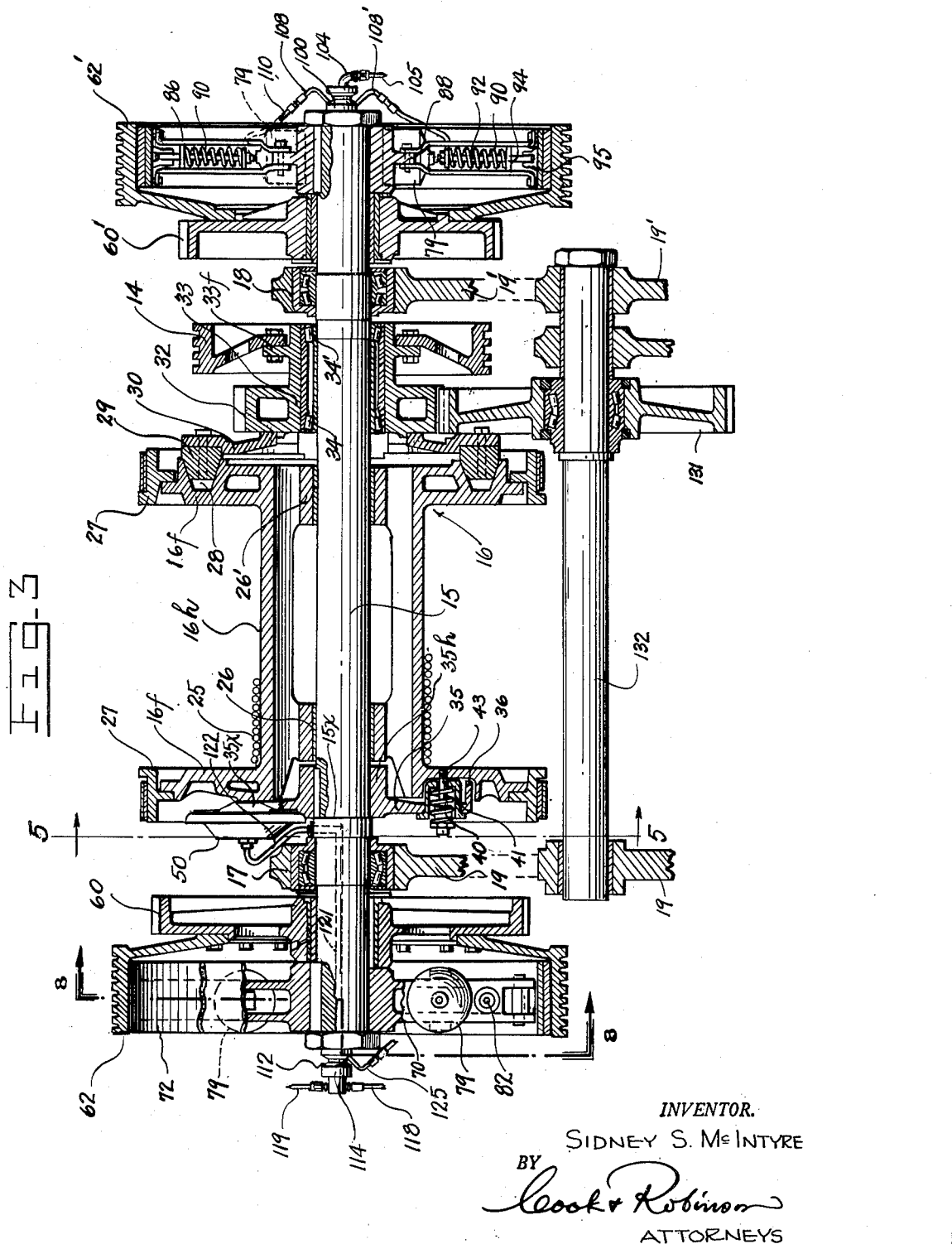

March 9, 1954  S. S. McINTYRE  2,671,639
DRUM INTERLOCKING AND POWER REGENERATIVE BRAKING SYSTEM
Filed June 23, 1952  7 Sheets-Sheet 4
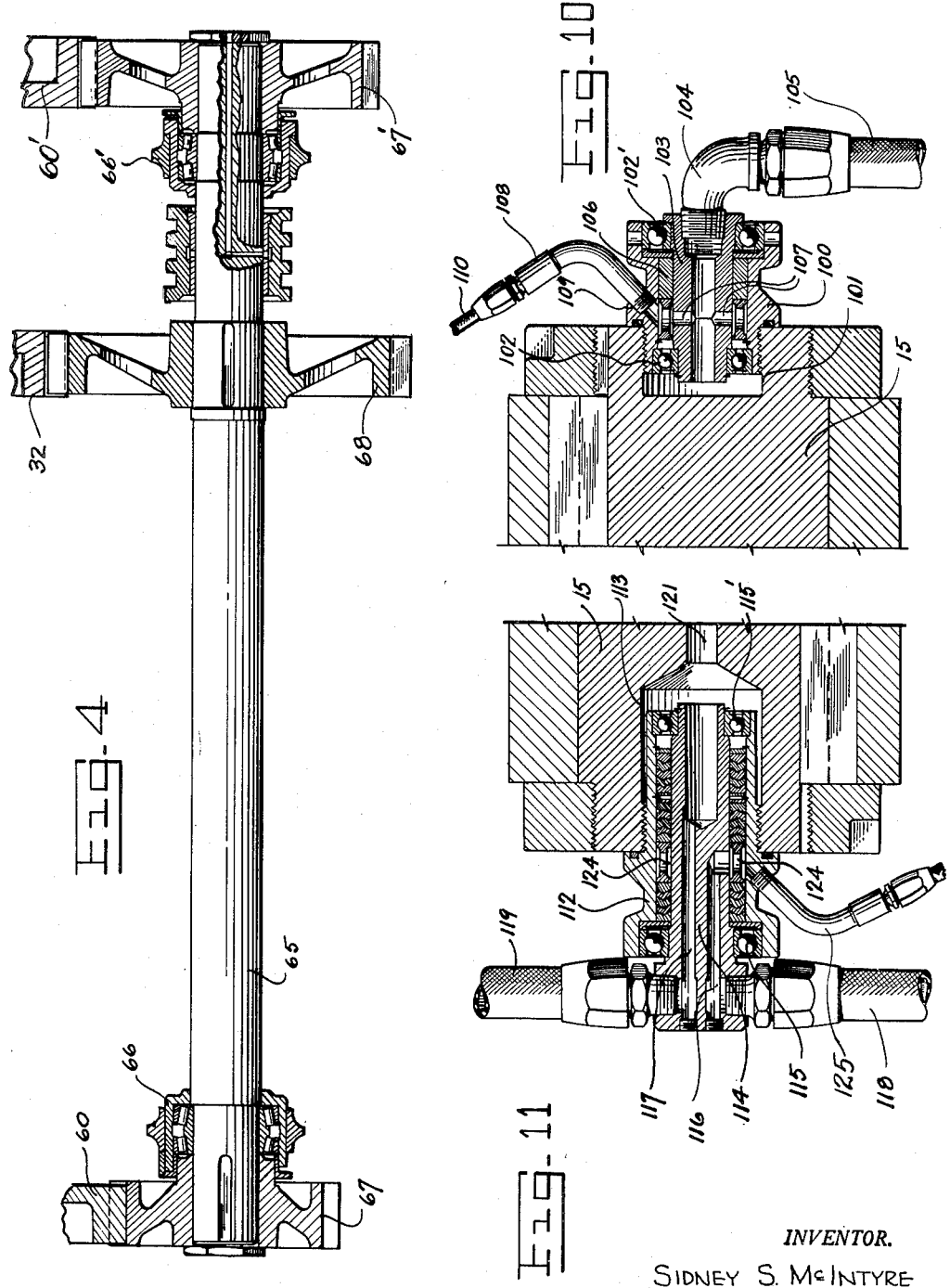
INVENTOR.
SIDNEY S. McINTYRE
BY
Cook + Robinson
ATTORNEYS

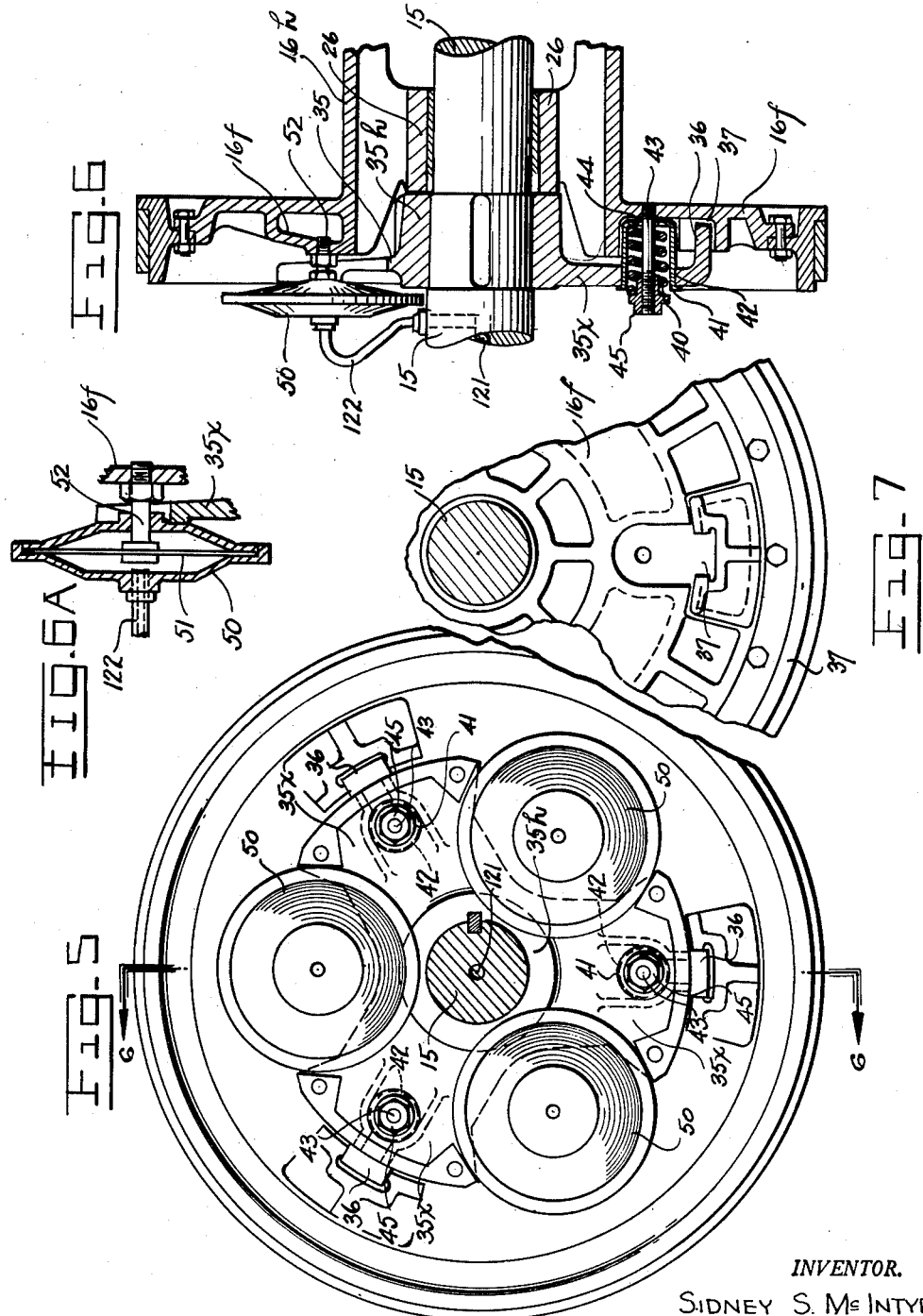

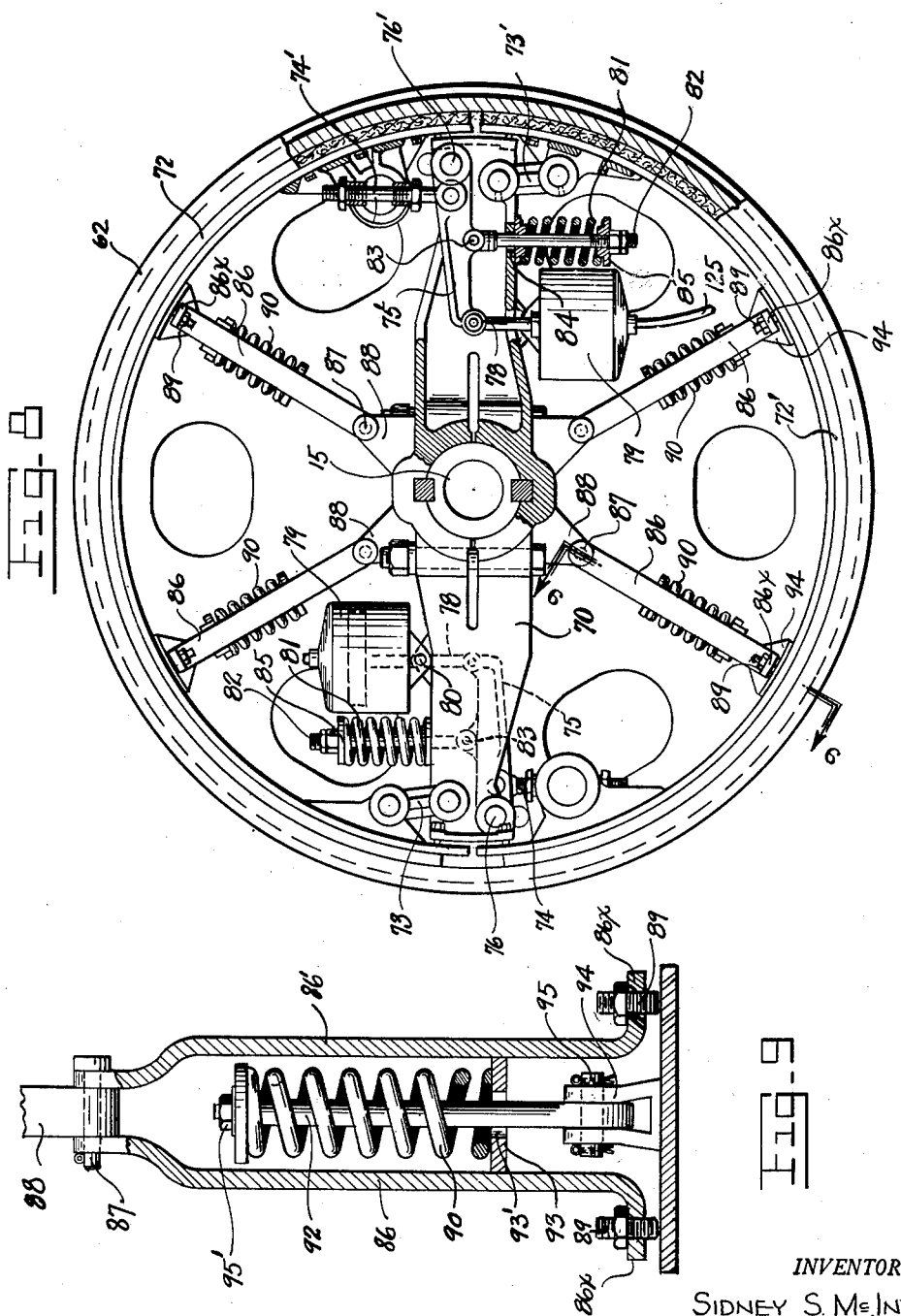

March 9, 1954  S. S. McINTYRE  2,671,639
DRUM INTERLOCKING AND POWER REGENERATIVE BRAKING SYSTEM
Filed June 23, 1952  7 Sheets-Sheet 7
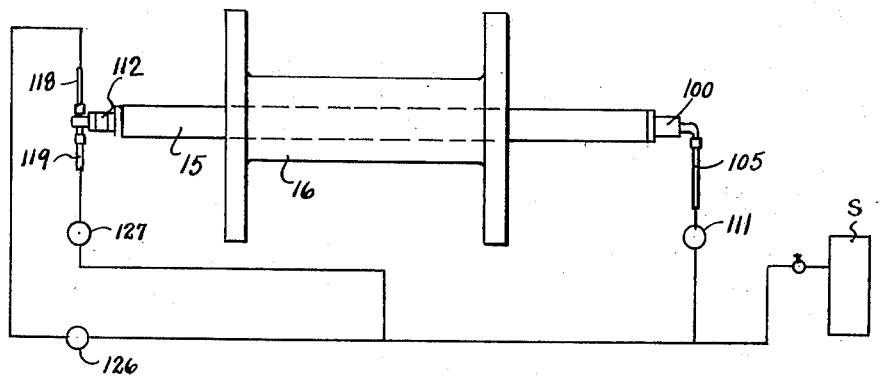
Fig. 12
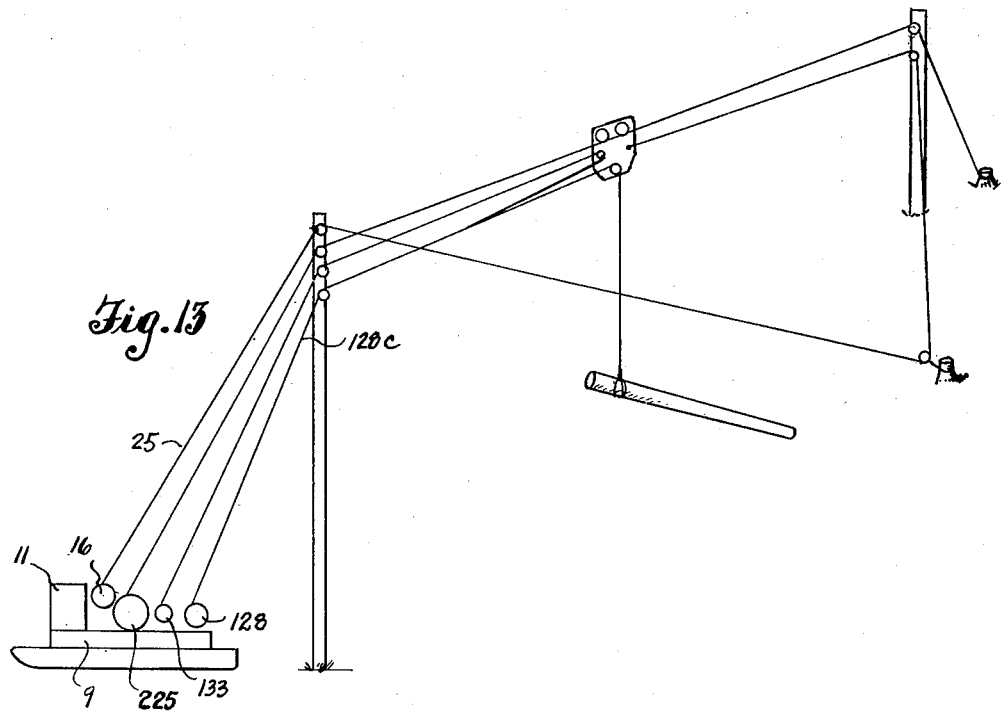
Fig. 13
INVENTOR.
SIDNEY S. McINTYRE
BY
ATTORNEYS Patented Mar. 9, 1954

2,671,639

UNITED STATES PATENT OFFICE 2,671,639

DRUM INTERLOCKING AND POWER REGENERATIVE BRAKING SYSTEM

Sidney S. McIntyre, Sedro Woolley, Wash.

Application June 23, 1952, Serial No. 295,090

8 Claims. (Cl. 254—185)

This invention relates to improvements in hoisting engines used to transport materials by means of wire cables. More particularly it has reference to what I herein designate as a "drum interlocking and power regenerative braking system," especially designed to save fuel and brake wear in the operation of various present day cable systems.

The six most commonly used systems of transporting materials by means of cables and especially applicable to logging apparatus, are:

(1) Ground skidding or dragging the load on the ground.

(2) Highlead yarding where the inhaul cable is led from the hoisting engine drum to a block or pulley located above on a mast or spar to impose both horizontal and vertical components of force on the load.

(3) The "North Bend System," where a carriage running on a suspended track cable is used in conjunction with an inhaul cable and an outhaul cable to wholly or partially suspend the load during the inhaul cycle.

(4) Lidgerwood Skidding, which is a modification of the North Bend System.

(5) Slack Skyline Skidding, also a modification of the North Bend System employing a means of raising and lowering the suspended carriage line.

(6) The Tyler System, another modification of the North Bend System, employing a fourth cable to lift the load.

Regardless of the system used, an inhaul cable for pulling the load in one direction and an outhaul cable for pulling the empty inhaul rigging back for the next load are required. Also there is always the problem of keeping both inhaul and outhaul lines off the ground and under tension to prevent cable abrasion and to provide for the even spooling of the cable on the drums. When systems 2, 3 and 4 are employed a second problem arises. These systems require that the outhaul line be payed out under a tension sufficient to give the necessary lift to wholly or partially suspend the load during the inhaul cycle. Mechanical braking devices prove very expensive and unsatisfactory for this requirement due to a wastage of power and excessive cost of maintenance. A mechanical interlocking device working between the inhaul or outhaul drums to transfer the tensional stresses from the outhaul cable to the inhaul cable eliminates this wastage.

Heretofore, interlocking devices have been made using special gears and friction clutches on the inhaul and outhaul drums, but the correct interlocking gear ratio between the inhaul and outhaul drums continuously changes as one cable winds up on its drum and the other cable unwinds. As a result a great amount of skill on the part of the operator is needed to release frictions and to apply brakes at the right time.

Generally speaking, for a given job, one of the six conventional cable systems mentioned will work more efficiently than any of the other five, but different drum arrangements are required and since regardless of the system used an interlock is either necessary or very desirable, it is evident that a single interlocking device which is workable between more than two drums makes it possible to cheaply construct one hoisting engine adaptable for efficiently operating any of the six commonly used cable transportation systems. This is a very important advantage, particularly on logging operations where requirements change from week to week depending on the topography of the ground logged.

Conventional interlocks heretofore used are built inboard between the hoist frames and are component parts of the cable drum assemblies. This type of construction limits their capacity to the space available, and makes it extremely expensive and difficult to obtain proper interlocking ratios. My interlock is outboard with no space limitations. This permits the use of a large variable pressure air cooled brake clutch combination which provides a positive clutch drive for holding the load completely suspended, a slipping clutch drive for holding one end of a load free off the ground or a lighter slipping action to maintain a slight tension on the cables for keeping the cables off the ground and better spooling on the drums. In downhill skidding, holding one end of the load suspended and allowing the other end to drag eliminates much of the brake wear.

The independent outboard interlocking arrangement as described makes it possible to drive a series of two or more drums with a single gear train and to proportion the gear and drum sizes to give proper interlocking relations between the outhaul drum and any other drum in the gear train. This feature makes it possible to build one simple compact hoisting engine which will operate all of the six conventional cable transportation systems efficiently.

In the operation of a conventional interlock the difference between the correct interlocking gear ratio and the actual ratio is compensated for by releasing the interlocking clutch, holding one drum with a brake and winding up or slipping the friction clutch on the second drum all of which require either great skill and judgment on the part of the operator or a work stoppage while the adjustment is made. The air operated variable pressure interlocking clutch brake which I have designed eliminates these difficulties. The operator sets a variable pressure hand control valve which maintains automatically a predetermined tension between the inhaul and outhaul cables. By changing the setting of the control valve a suspended load can be held, lowered or raised at will without interrupting the inhaul cycle.

My invention has made it possible in constructing logging machinery:

(a) To reduce weight and increase mobility.

(b) To reduce the cost by simplifying constrution.

(c) To reduce maintenance expense by reducing brake wear.

(d) To increase efficiency by utilizing power otherwise consumed by mechanical braking.

(e) To build one machine capable of operating any of the six conventional cableway systems.

It has been the principal object of this invention to provide novel means in a yarder, or in a similar machine, whereby braking energy that is normally dissipated as heat without useful purpose, will be returned to the system to supplement the driving power as supplied by the engine and will thus be put to a useful purpose.

More specifically stated, it is the principal object of this invention to provide novel means for effecting a frictional interlock in association with the gear train for the driving of the various cable winding drums, whereby braking energy, as applied to any of the drums, will be returned to the system to supplement the driving force.

It is a further object of the present invention to provide a frictional interlock as above stated to complement the drum driving gearing of a yarder, through the utilization of selectively useable brakes whereby to automatically maintain the proper interlock ratio through brake slippage.

Still another object of the invention is to provide a two-speed interlock feature in the connection with the drum driving gear train comprising a high ratio interlock brake and a low ratio interlock brake which may be selectively utilized to best suit operating conditions for the return of braking energy to the power system.

Further objects of the invention reside in the details of construction of parts, and in their combination and mode of operation, as will hereinafter be fully described.

In accomplishing these and other objects of the invention, I have provided the improved details of construction, the preferred forms of which are illustrated in the accompanying drawings, wherein—

Fig. 1 is a side view of a hoisting engine embodying the novel features of the present invention therein.

Fig. 1a is a diagrammatic, perspective view of the gearing directly associated with the two frictional interlock mechanisms.

Fig. 2 is a plan or top view of the hoisting engine.

Fig. 2a is a view diagrammatically showing the drum driving gear train of the hoisting engine in which the present interlock is incorporated.

Fig. 3 is a cross-sectional view, taken substantially on line 3—3 in Figs. 1 and 2.

Fig. 4 is a cross-sectional detail of parts, taken on the plane of line 4—4 in Fig. 1.

Fig. 5 is a cross-section taken on the line 5—5 in Fig. 3, showing the arrangement of clutch control cylinders.

Fig. 6 is a cross-sectional detail on line 6—6 in Fig. 5.

Fig. 6a is a cross-sectional detail of one of the air cylinders.

Fig. 7 is a fragmental elevation of a part of the end flange of the inhaul drum.

Fig. 8 is an end elevation and partial cross-sectional detail of one of the brake mechanisms, the view taken substantially on line 8—8 in Fig. 3.

Fig. 9 is an enlarged cross-sectional detail taken on the line 9—9 in Fig. 8.

Fig. 10 is an enlarged sectional detail of the swivel fitting applied to one end of the drum mounting shaft for delivery of operating air to the brake mechanism at that end.

Fig. 11 is a similar view of the swivel fitting applied to the other end of the drum shaft for delivery of operating air to the brake and clutch operating cylinders at that end.

Fig. 12 is a diagrammatic illustration of the pneumatic control system for the brake and clutch devices associated with the present invention.

Fig. 13 is a diagrammatic showing of a cable system with which a yarder embodying the present invention is used.

In the present drawings, I have illustrated a typical form of hoisting engine embodying the improvements of the present invention therein. These same improvements may, in a like manner be applied to machines that differ from that shown in the arrangement and number of drums employed. Therefore, it is not intended that the invention be restricted to, or that it be considered as applicable only to hoisting engines of the particular type shown, but rather that it be understood to be applicable to any comparable construction having its cable winding drums driven in substantially the same way.

Referring more in detail to the drawings—

In Figs. 1 and 2, I have illustrated a type of hoisting engine that is adapted for the yarding of logs by use of those various cable systems which in the industry are designated by names such as "Highlead," "Skidder," "Skyline," "Slack line," "Down hill," "Tyler," "Lidgerwood," etc. This particular yarder is characterized by the embodiment therein of frictional drum interlocks, providing two selectively useable speed ratios, and each providing automatically for that particular amount of slippage between the cable winding drum and its driving members that is required to compensate for that relative change in effective diameters of interlocked cable winding drums while cables are being wound onto one and from the other.

In Figs. 1 and 2, 9 designates a rectangular base frame structure of the yarder and 10 designates the hoisting engine in its entirety; 11 designates an engine of any suitable type that is mounted across one end of the base frame structure and is operatively connected through the medium of a plurality of suitable chain belts, designated by numeral 12, to drive the cable winding drums of the yarder mechanism. It has been indicated rather diagrammatically in Fig. 1 that the belts 12 operate about a sprocket wheel 13 on the drive shaft 11' of the engine and a substantially larger sprocket wheel 14 that is mounted, as presently more fully explained in connection with the description of the mechanism of Fig. 3, to revolve on a drive shaft 15 that revolubly mounts the main or outhaul cable drum 16 of the yarder thereon.

By reference more particularly to Figs. 1 and 3, it will be noted that the shaft 15 is located above and extends transversely of the base frame 9. It is revolubly supported, at distances inwardly spaced from its opposite ends, in bearings 17 and 18 that are carried in frames 19—19' mounted upon and bolted or otherwise suitably fixed to the opposite side beams of the base frame. The opposite end portions of the supported shaft 15 extend outwardly beyond the supporting bearings 17 and 18 for the mounting thereon of the brake mechanisms and associated parts that are comprised in the present regenerative system. Preferably the bearings 17 and 18 are of an anti-friction type and are so designed as to retain shaft 15 against any endwise movement.

The outhaul drum 16 is rotatably mounted on shaft 15 between its supporting bearings 17 and 18. Wound on the drum is the inner end portion of the haulback cable 25. It is shown in Fig. 3 that the drum has a cylindrical hub portion 16h within the opposite end portions of which supporting bearings 26—26' are provided. These bearings rotatably mount the drum for rotation and for limited endwise movement on the supporting shaft 15. At its opposite ends, the hub portion of the drum is equipped with the usual cable retaining flanges 16f to each of which an encircling flange 27 is fixed for mounting a brake band.

The flange 16f at that end of the drum 16 which is nearest the shaft supporting bearing 18, that being the right hand end as seen in Fig. 3, is formed in its outer face and concentrically of the drum axis, with a tapered clutch block channel 28 that contains therein a plurality of clutch blocks 29 that are fixed on a clutch disk 30. The disk 30 is coaxial of and is bolted to the face of a driving gear wheel 32. The gear wheel 32 has an integrally cast, cylindrical hub portion 33 that extends therefrom and toward the bearing 18. The hub 33 is provided with an encircling flange 33f to which the previously mentioned engine driven sprocket wheel 14 is bolted, thus providing for a direct driving connection between the engine and the gear 32 to which the clutch disk is fixed.

The gear 32, and sprocket wheel 14 as fixed on the gear supporting hub portion 33, are mounted to revolve coaxially on the shaft 15; being supported by anti-friction bearings 34—34' that are applied about shaft 15 and within the opposite ends of the hub. While the hub 33 is held against any endwise movement relative to shaft 15 by its mounting bearings 34—34', the drum 16, as supported by its bearings 26—26' is permitted that slight endwise movement relative to shaft 15 that is required in order that the clutch blocks 29 may be disengaged from or engaged in driving contact with the channeled drum flange 16f.

The endwise movement of the drum 16, in a clutch disengaging direction is limited by the engagement of the end of its mounting bearing, 26, with the hub portion 35h of a disk 35 that is keyed on the shaft 15 adjacent the left hand end of the drum as shown in Fig. 3. It is there shown that the hub 35h is seated at one end solidly against a shoulder 15x formed on the shaft by a diametrical enlargement thereof, thus to prevent any possible outward slippage of the disk 35. The disk 35 is shown in Fig. 5 to be of spider form and to comprise three equally spaced radially directed legs 35x which, at their outer ends, have integral, inturned toes 36 that are slidably fitted in seats or sockets 37 formed in the face of the adjacent end flange 16f of the drum 16 as seen in Fig. 6. The three inturned toes 36 of the spider form a positive driving connection between the disk 35 and drum 16, yet permit that slight endwise shifting of the drum that is necessary to engage it with or to release it from the clutch blocks 29 on the driven disk 30. When the clutch is tightly engaged, the drum 16 will rotate in unison with the driven sprocket 14.

To urge the drum 16 endwise, from an engaged position to a position at which it is disengaged from the clutch blocks, I utilize three coiled springs 40 that are arranged as shown in Figs. 5 and 6; these springs being contained in cups 41 that are seated in and project inwardly through openings 42 of the three leg portions of the disk 35. At their inner ends the springs rest against the bases of the cups. Bolts 43 are passed coaxially through the springs and are extended through holes 44 in the bottoms of the cups and have their inner ends threaded into and fixed in the adjacent end flange of drum 16. At their outer ends the bolts have nuts 45 threaded thereon and seated against the outer ends of the springs. The nuts are adjustable on the bolts to subject the springs to and retain them under that amount of compression necessary for the quick, positive shifting of the drum to a position disengaged from the clutch blocks whenever the clutch engaging force is relieved.

To engage the drum flange 16f with the clutch blocks 29 as required to effect a driving or holding connection with disk 30, I utilize three air cylinders 50. These cylinders are mounted between and fixed to leg portions 35x of the disk 35, as shown in Fig. 5; each cylinder being rigidly fixed to the disk with its axis parallel to shaft 15. Each cylinder contains a diaphragm type piston 51 that is connected at its center by a rod or bolt 52 with the end flange of drum 16 as has been shown in Fig. 6a. When compressed air is admitted to the three cylinders as presently explained, it acts against the diaphragms to cause them to be forced laterally, thus through the connections provided, to shift the drum and cause the clutch to be engaged for the driving of the drum in unison with sprocket 14. When air pressure is released from the cylinders, 50, the drum 16 will be shifted by the force of the three springs 40, to disengage it from the clutch. The means for the application of operating air to the air cylinders 50 will be described later in connection with the description of means for applying operating air to the brakes.

Mounted on the opposite end portions of the shaft 15 are gear wheels 60 and 60'; these being freely revoluble on the shaft, outside of but closely adjacent the shaft supporting bearings 17 and 18, respectively. Bolted to the outer faces of these gear wheels 60 and 60' respectively, are brake drums 62 and 62', and attached on the gears 60 and 60' within each of the brake drums, are expansible brake mechanisms through the medium of which driving connections may be selectively effected between the drum mounting gears 60—60' and the shaft 15, as presently fully explained.

In Figs. 2 and 4, it is shown that a cross-shaft 65 is revolubly supported in bearings 66—66'; these being formed in the same frames 19—19 in which the shaft bearings 17 and 18 are located. Keyed on the opposite ends of this cross-shaft 65 are gear wheels 67—67' which mesh with the gear wheels 60—60' respectively. It is further to be observed in Fig. 3 that gear 60 is of greater diameter than gear 60'; and consequently gear 67 is of lesser diameter than gear 67'. By reason of this difference in gear ratios, the two-speed interlock feature previously mentioned and later to be described more fully, is accomplished. Also keyed on shaft 65, as shown in Fig. 4, is a driving gear wheel 68 that meshes with a gear 131 that is driven by gear 32 as observed in Fig. 2a; this driving connection presently being more fully described.

It is further to be explained that when the cable 25 is being pulled out by the effort of any of the other drums through connections presently described, shaft 15 is driven by the arms 35 and by the use of the brakes 72 and 62, gear 60 is driven, resulting in application of power to the gears 66 and 67. This power is transmitted to the drum set through gears 68 and 32.

The braking mechanism associated with drum 62 is fully illustrated in Figs. 8 and 9 and it will be understood that the following description of the mechanism shown in these two views will apply equally to the braking mechanism associated with drum 62' at the opposite end of shaft 15. Like reference numerals will be applied to like parts of the two mechanisms.

Keyed on the end of shaft 15, within the cylindrical brake drum 62, is a hollow cross arm 70, the opposite ends of which terminate close to the inner surfaces of the drum. Disposed within the brake drum, at opposite sides of the cross arm 70 are substantially semi-circular brake shoes 72—72' which have corresponding ends thereof pivotally connected to opposite ends of the cross arm 70 by short links 73—73'. The other ends of the two shoes are pivotally connected by links 74—74' with brake setting and release levers 75—75'. These latter levers are disposed within the hollow cross arm 70, in directions substantially radially of the drum, as seen in Fig. 8 with their outer ends pivotally fixed to the corresponding end portions of the cross arm 70, by means of pivot bolts 76—76'. At their inner ends the levers 75—75' are pivotally connected to the outer ends of piston rods 78 extending from air cylinders 79 that are pivotally supported from the cross arm by means designated at 80. It is shown on Fig. 8 that the links 74—74' are connected with their respective brake control levers 75—75' at short distances inwardly spaced from the pivot bolts 76—76'. Therefore, the brakes can be applied by an application of air to the cylinders 79—79 that operates to extend the piston rods. When operating air pressure is released from the cylinders, the brake shoes are retracted from the brake drums by means of springs 81 that are applied about pull rods 82 that have their inner ends pivotally attached to the braking levers, 75—75', as at 83, and which pass through openings 84 in the cross arm; the springs being seated at their inner ends against the cross arm and at their outer ends against nuts 85 that are threaded onto the outer ends of the rods. The nuts are adjusted to place the springs under the required compression to accomplish their purpose.

It is also shown in Figs. 8 and 9 that radial brace members extend between the hub portion of the cross arm and the brake shoes. Each of these members comprises paired, parallel links 86—86' that are attached by pivot bolts 87, passed through their inner end portions, to projecting ears 88 formed on the hub of the cross arm 70. At their outer ends the links 86—86' have outturned feet 86x through which set screws 89 are adjustably threaded to engage with the brake shoes. Coiled springs 90 are associated with each of the radial members to yieldingly pull the brake shoes to positions clear of the drum when braking pressure, as applied by the air cylinders 79, is released. It is shown in Fig. 9 that the spring 90 is applied about a bolt 92 that passes through a hole 93' in a cross bar 93 extended between and rigidly joining the links 86—86'. At its outer end, the bolt 92 is pivotally attached to a bracket 94 on the brake shoe by a pin 95 and at its inner end it carries a nut 95' that retains the spring under that compression necessary to draw the shoe away from the drum surface when braking force is released.

Provision is made for an application of air under pressure to the air cylinders 79 of the braking mechanism at the right hand end of the shaft 15 as seen in Fig. 3, through a swivel fitting that is applied to that end of the shaft. This fitting, as shown best in Fig. 10, comprises a housing 100 that is threaded, in an air sealed joint, into a coaxial bore 101 in that end of the shaft. Rotatably mounted in the housing 100, coaxially thereof, by means of ball bearings 102—102' applied about its opposite end portions, is a tubular spindle 103, into the outer end of which a pipe connecting fitting 104 for an air pressure supply pipe 105, is threaded. The outer end of the annular passage between the tubular member 103 and housing 100 is sealed by packing designated at 106. The tubular member 103 is formed with radial ports 107 through which the operating air, supplied through the pipe 105 is admitted to two tubular connectors 108—108' that have inner ends threaded into holes 109 opening through the housing, and at their outer ends are connected by pieces of hose 110 with the air cylinders 79—79, respectively, of the corresponding braking mechanism. Operating air is supplied to the pipe 105 from a source of supply s under control of a suitable pressure regulating valve as indicated in Fig. 12 at 111. Thus, the braking friction of the shoes can be made more or less, and retained through the adjustment and setting of the valve 111.

The means for connecting operating air with the braking and clutch setting mechanisms at the left hand end of the shaft 15, as seen in Fig. 3, comprises a swivel fitting best shown in Fig. 11, formed by an elongated housing 112 that is threaded into a coaxial bore 113 in that end of shaft 15 in an air sealed joint. Revolubly contained in the housing 112, coaxially thereof, is a tubular member 114 supported at its ends by anti-friction bearings 115—115'. Formed lengthwise within the member 114 from its outer end, are channels 116 and 117 to the outer ends of which air pressure supply pipes 118 and 119 connect. These supply lines are connected to the source of supply of air under pressure as presently explained. At its inner end, the channel 117 communicates with an axial bore 121 in the shaft 15. The bore 121 has three lateral outlets to which tubes 122 connect. These tubes lead respectively to the three clutch setting air cylinders 50 shown in Fig. 5.

The channel 116 opens at its inner end laterally from the member 114 and to an annular channel 124 between parts 112 and 114, and with which channel the inner ends of two pipes 125 connect through the wall of housing 112. At their outer ends, the two pipes 125 are connected, respectively, with the two air cylinders 79 of the adjacent braking mechanism. Air is applied from the source of supply s to the supply pipes 118 and 119 under control of regulating valves 126 and 127, that are connected in the system as shown in Fig. 12.

Referring further to Figs. 1 and 2, it is therein shown that in addition to main line or haul back drum 16, the yarder includes a skyline drum 225 supported on the base frame by a cross-shaft 226, and likewise, a tong line or haul-in drum 128 supported on a cross-shaft 129. Between these drums there is mounted a slack puller drum 133 on a cross shaft 134. The driving of these several drums is effected through a gear train as shown in Figs. 2 and 2a, including a large gear wheel 130 for driving the skyline drum, and revoluble on shaft 226 in mesh with the previously mentioned idler gear 131 mounted on a cross shaft 132 seen in Fig. 2a; this idler meshing also with the gear wheel 32 that is fixed to sprocket wheel 14.

The tong line drum 128 is driven by a gear 135 revoluble about shaft 129 and in driving mesh with an idler gear 136, that meshes also with the skyline drum gear 130; the idler 136 being supported by a cross shaft 134 which mounts the slack puller drum 133.

It will further be explained that all the several drums 225, 128 and 133, are driven by their respective gears 130, 135 and 136 through the medium of the conventional and commonly used clutch mechanisms which are not herein shown, and the drums also are equipped with the usual braking means for holding them against rotation when their clutches are disengaged. The gear train as shown in Fig. 2a, and as driven by gear 32, runs continuously and the various drums may be selectively caused to be driven by the setting of their respective clutch mechanisms. The shaft 65 as connected by gear 68 with gear 131, likewise rotates continuously and serves as a means for returning energy to the gear train as explained in the following:

In a cable logging operation, using the set up of Fig. 13, and utilizing the present type of yarder, with drum arrangement as seen in Fig. 2, the drum 16 is the outhaul drum and it has two functions, viz., first, to pull the empty rigging back, after unloading, to receive the next load and second, during an inhaul cycle, to counteract the tension on the inhaul cable as a means of keeping the load wholly or partially suspended.

The drum 128 is here the inhaul drum, or as sometimes called, the tong line drum or main line drum, and it is used to raise the load and then after the interlock is engaged, to pull the load onto the spar tree.

The drum 133 is the slack puller drum used to pull the tong line rigging back to the ground for hooking onto the next load, and the drum 225 is the carriage line drum which is inoperative after the carriage line which extends therefrom is tightened and dogged. In this setting, the tendency of the load L to run down hill out of control makes it imperative that the brakes be applied to the haul-back drum 16. At the same time the inhaul drum 128 must be driven to bring in the load because of the requirement that the braking energy as applied to the drum 16 must not only be sufficient to prevent free running of the load down hill, but must be so increased over that amount, that pull on the inhaul cable 128c will cause the load to be lifted up in the clear of usual ground obstructions.

In using the yarder as equipped with the present regenerative braking system of this invention, to a down hill operation as in Fig. 13, the drum 128 which is hauling in the load, will be positively driven by the engine through the gear train including the gears 32, 131 and 130, 136 and 135, as seen in Figs. 2 and 2a. The drum 16 will be rotated by the pull of the receding cable 25 and will cause shaft 15 to rotate accordingly by reason of the interlocking of disk 35, with the drum as shown in Fig. 6. Therefore, by a selective setting of the expanding brakes as carried by the cross arms 70 at the outer ends of shaft 15, braking friction for retarding the drum 16 can be established with the brake drum 62 or 62' and the gear wheels 60 and 60' fixed thereto, will be driven in unison with the driven drum.

By reference to Figs. 2 and 4, it will be understood that if either gear 60 or 60' is caused to be driven, the shaft 65 will be driven accordingly through gear 67 or 67', the gear wheel 68, which is keyed on shaft 65, will transmit driving energy to gear 32. The same result takes place whether the driving be through brake drum 62 or 62' and the reason that driving energy is transmitted to the gear train is due to the fact that the gear ratio, in the connection between the drum 16 and the gear 32, through the gears on shaft 65, is such as to tend to cause the gear 32 to be driven faster than it is being driven by its driving connection with the engine.

The operator of the yarder selects the drum 62 or 62', that will best suit conditions as based on the effective diameters of the cable winding drums; it being understood, as between the two drums being used, there is a constant change in effective diameter by reason of the winding of cable into one and off the other. The ratio of gears of the gear train as shown in Figs. 2 and 2a has been found to be most practical for present day operations.

In the present arrangement, of drums, the yarder may be adapted to various systems of logging, but in any event the functioning of the present regenerative system anticipates that drum 16 shall carry the outgoing cable and that drum 125, 128 or 133 shall carry the inhaul cable. The energy of braking as applied to the drum 16, by applying the brake of either drum 62 or 62' will then be returned in substantial amount through shaft 65 to gear 68 and thus to the gear train as driven by gear 131.

The present embodiment of the invention in a yarder as shown in Fig. 2 can be used to operate any of the conventional skyline skidding systems or for high land logging, since each employs the out haul drum 16 in conjunction with one of the other drums.

Furthermore, the incorporation of the present regenerative braking mechanism in the yarder in no way interferes with the normal or usual use of any of the cable winding drums. When drum 16 is to be driven by clutch elements 29 on disk 30, the brake mechanisms are disengaged from drums 62—62'.

It is of significance to note that the pressure regulating valves 111, 126 and 127 may be so adjusted as to permit clutch slippage as may be required under the particular condition of operations and a correct, operative interlock ratio automatically maintained.

Having thus described my invention, what I claim as new therein, and desire to secure by Letters Patent, is:

1. In a cable system for the transporting of materials; an inhaul cable winding drum, an outhaul cable winding drum, cables applied to and extending from said drums and adapted to be wound onto and from the same and operatively connected at their outer ends in a manner whereby the winding of the cable onto the inhaul drum effects the drawing out of the cable from the outhaul drum and the driving of that drum accordingly, an engine having driving connection with the inhaul drum, an adjustable braking system for restraining the unwinding of cable from the outhaul drum incident to winding in the inhaul cable and means for transmitting the braking energy thus expended to the said driving connection to supplement the driving energy of the engine.

2. In a cable system for the transporting of materials; an inhaul cable winding drum, an outhaul cable winding drum, cables applied to and extending from said drums and adapted to be wound onto and from the same and operatively connected at their outer ends in a manner whereby the winding of the cable onto the inhaul drum effects the drawing out of the cable from the outhaul drum and the driving of that drum accordingly, an engine driven gear train with a driving connection with the inhaul drum, a braking system for restraining the unwinding of the cable from the outhaul drum including a rotatably mounted brake drum and braking elements rotatable with the outhaul drum engaged in nonpositive frictional driving contact with the said rotatably mounted brake drum and a driving connection between the brake drum and gear train through which the braking energy expended in the braking operation is transmitted to the gear train to supplement the driving energy of the engine.

3. In a cable system designed for the transportation of materials; an inhaul cable winding drum, a revolubly mounted shaft, an outhaul cable winding drum mounted by and fixed against relative rotation on said shaft, cables applied to and adapted to be wound onto and from said drums and operatively connected at their outer ends in a manner whereby the winding of the cable onto the inhaul drum effects the unwinding of the cable from the outhaul drum and the driving of that drum accordingly, an engine driven gear train connected with the inhaul drum to drive it, a braking system for restraining the unwinding action of the outhaul drum including a brake drum rotatable on said revolubly mounted shaft, brake shoes rotatable with the shaft, means for causing the shoes to frictionally engage in a non-positive connection with the drum to restrain the unwinding of cable from the outhaul drum, and a geared connection between the drum and said gear train so designed as to cause the transmittal of braking energy from said drum to the gear train to supplement the driving energy of the engine.

4. In a cable system designed for the transportation of materials; an inhaul cable winding drum, a revolubly mounted cross-shaft, an outhaul cable winding drum mounted by and fixed against relative rotation on said cross-shaft, cables applied to and extended from said drums and adapted to be wound onto and from the same and operatively connected at their outer ends in a manner whereby the winding of the cable onto the inhaul drum effects the drawing out of the cable from the outhaul drum, and vice versa, an engine driven gear train, selectively engageable clutch mechanisms for driving the said drums from the gear train, a braking mechanism for the outhaul drum including a rotatably mounted brake drum, brake shoes rotatable with the outhaul drum and means for effecting application of braking friction by said shoes against the drum, and gearing connecting said brake drum with the engine driven gear train for the dissipation of the expended braking energy thereto to supplement the driving energy of the engine.

5. A system as recited in claim 4 wherein the means for effecting the application of braking friction comprises an air cylinder, a source of air under pressure, and a connection between said source and cylinder including a pressure regulating valve.

6. In a cable system designed for the transportation of materials; a frame structure, a cross-shaft revolubly mounted therein, an outhaul cable winding drum mounted on the cross-shaft and fixed against relative rotation thereon, an inhaul cable winding drum revolubly mounted in the frame structure, cables applied to and adapted to be wound onto and from said drums and operatively connected at their outer ends in a manner whereby the winding in of the inhaul cable by its drum effects to drawing out of cable from the outhaul drum and the driving of the drum accordingly, a plurality of selectively useable braking systems for said outhaul cable winding drum, each comprising a brake drum that is revoluble on the cross-shaft, friction brake shoes rotatable with the outhaul drum and means for effecting the application of a predetermined braking friction by the shoes of any brake drum to retard the unwinding of the outhaul cable, an engine driven gear train providing a driving connection with the inhaul drum, and a revolubly mounted countershaft having a driving connection with the gear train, and having geared connections of different ratio with each of the brake drums through which the braking energy of a selected braking system will be transmitted to the gear train to supplement the driving energy of the engine.

7. In a cable system designed for the transportation of materials, a frame structure, a plurality of selectively useable inhaul cable winding drums, and an outhaul cable winding drum common to all of the inhaul drums, cables wound on said drums and extended therefrom for operative connection at their outer ends in a manner whereby the inhauling of any cable by its drum will effect the drawing out of cable from the outhaul drum and driving of the drum accordingly, an engine driven gear train, clutch mechanisms associated therewith for selectively driving the inhaul drums, a cross-shaft revolubly mounting the outhaul drum thereon, a clutch mechanism adapted to be set to effect driving of the outhaul drum from the gear train, a braking system at each end of the outhaul train, each comprising a brake drum that is revoluble on the cross-shaft, brake shoes mounted on and fixed against relative turning on the shaft, means for effecting a controlled application of a predetermined braking pressure by either set of shoes against the corresponding brake drum, a countershaft with geared driving connection with the gear train and geared connections of different ratio between the two brake drums and the countershaft for the transmittal of the braking energy to the gear train to supplement the driving energy of the gear train.

8. A system as in claim 7, wherein the means associated with each braking system for effecting the controlled application of braking pressure comprises an air cylinder, a source of air under pressure, and a connection between said source of air and said cylinder including a pressure regulating valve.

SIDNEY S. McINTYRE.

References Cited in the file of this patent

UNITED STATES PATENTS

| Number | Name | Date |
|---|---|---|
| 1,555,906 | Burke | Oct. 6, 1925 |
| 1,555,907 | Burke | Oct. 6, 1925 |
| 2,543,765 | Davidson et al. | Mar. 6, 1951 |